A. J. HORTON.
CONTROLLER.
APPLICATION FILED MAY 11, 1916.

1,269,183.

Patented June 11, 1918.
2 SHEETS—SHEET 1.

Inventor
Albert J. Horton
By Frank H. Hubbard
Attorney

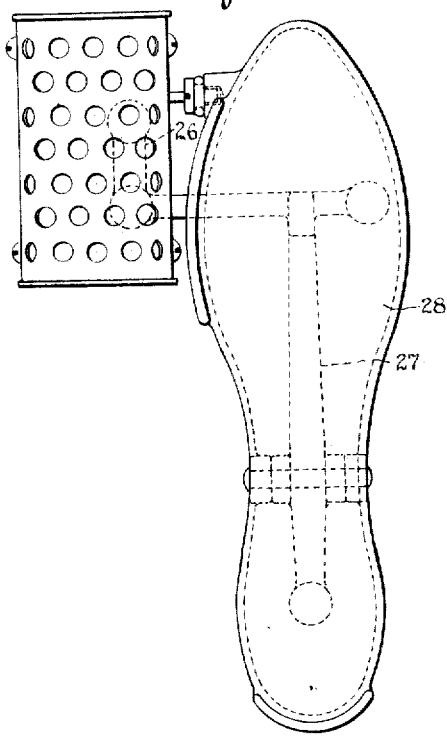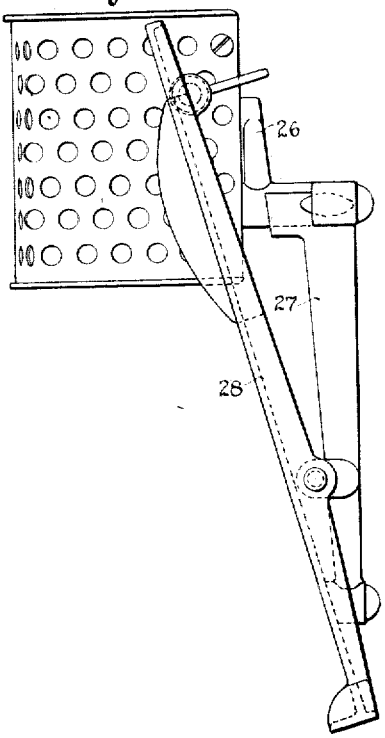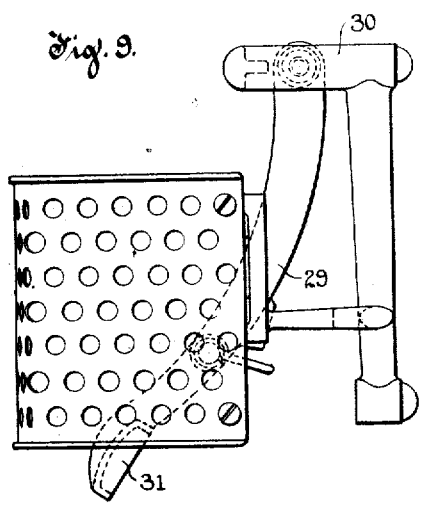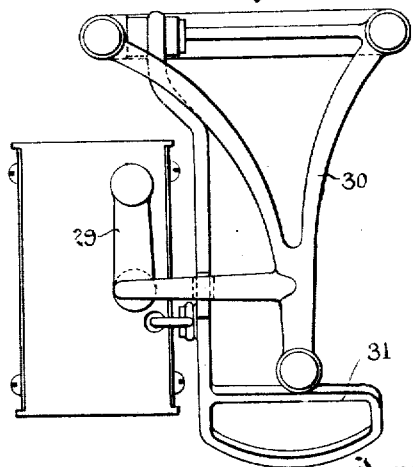

UNITED STATES PATENT OFFICE.

ALBERT J. HORTON, OF WHITE PLAINS, NEW YORK, ASSIGNOR TO THE CUTLER-HAMMER MFG. CO., OF MILWAUKEE, WISCONSIN, A CORPORATION OF WISCONSIN.

CONTROLLER.

1,269,183.  Specification of Letters Patent.  Patented June 11, 1918.

Application filed May 11, 1916. Serial No. 96,955.

*To all whom it may concern:*

Be it known that I, ALBERT J. HORTON, a citizen of the United States, residing at White Plains, in the county of Westchester and State of New York, have invented new and useful Improvements in Controllers, of which the following is a full, clear, concise, and exact description, reference being had to the accompanying drawing, forming a part of this specification.

This invention relates to improvements in controllers particularly adapted for control of sewing machine motors although susceptible of other uses.

The invention has among its objects to provide a simple, rugged and compact controller of the rheostat type adapted for mounting in various optional ways.

A further object is to provide a controller for the aforesaid and other purposes wherein provision is made for the biasing thereof to a neutral position and for rendering the same electrically inoperative upon the disabling of the biasing means.

Various other objects and advantages of the invention will hereinafter appear.

The accompanying drawing illustrates one embodiment of the invention which will now be described, it being understood that the controller illustrated is susceptible of various modifications without departing from the scope of the appended claims.

In the drawing,

Figs. 7 and 8 are respectively plan and side views of the controller and one mounting device therefor; and, Figs. 9 and 10 are respectively plan and side views of the controller and an alternative mounting device therefor.

Figure 1:
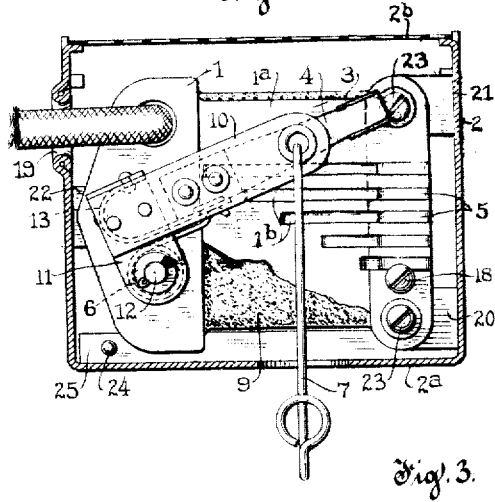
Figure 1 is an elevation of the controller with its casing shown in section and with the covering of the base partially broken away.
Figure 2:
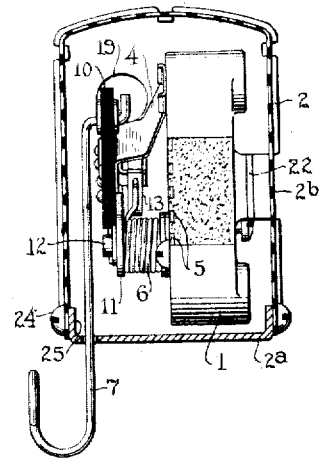
Fig. 2 is an end view of Fig. 1 but with the casing in section and with the base also partially in section.
Figure 3:
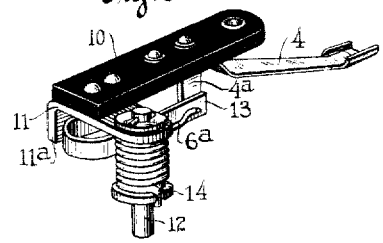
Fig. 3 is a detail perspective view of the movable element of the controller.

Referring to Figs. 1 to 6, the controller includes a base 1 supported within a casing 2, a resistance 3 coiled about said base, a contact arm 4 pivotally mounted upon said base and coöperating with a series of contacts 5 connected to said resistance. The arm 4 is biased by means of a spring 6 to disengage contacts 5 and is operable by a rod 7 to progressively engage said contacts for the establishment of circuit and the removal of said resistance from said circuit in steps.

Figure 4:
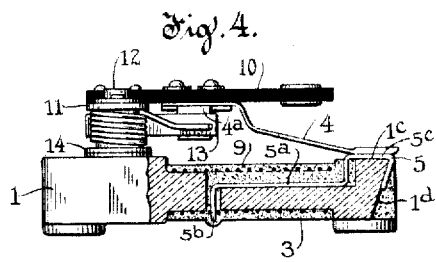
Fig. 4 is a side view of the controller removed from its casing and showing the base sectioned longitudinally.
Figure 5:
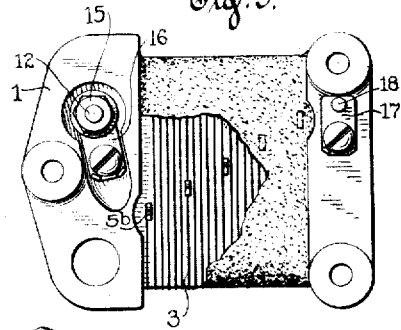
Fig. 5 is a plan view of the base partly in section.
Figure 6:
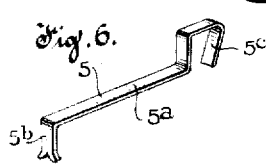
Fig. 6 is a detail perspective view of one of the contacts.

The base 1 is preferably formed of molded insulating material, and as best illustrated in Figs. 1, 4 and 5 is molded with a part 1ª of reduced cross section, said part also being provided with a series of grooves 1ᵇ of varying length. The grooves 1ᵇ are provided to receive shanks 5ª of the contacts 5, which shanks are of varying lengths and provided with right angle extremities 5ᵇ projecting through the base to the under side thereof. After arrangement of the contact shanks in the grooves said grooves are filled with a cementitious insulating mass after which the resistance 3, shown in the form of a wire, is wound around the part 1ª of the base and connected at intervals to the extremities 5ᵇ of the contacts. As best illustrated in Fig. 6 the extremities of the contacts are split and spread to thereby anchor the same to the base and to provide lugs about which the resistance wire may be wound for contact therewith. The section 1ª of the base is then given a cementitious insulating coating 9· to insulate both the resistance and the extremities 5ᵇ of the contacts. The base 1 is also molded to provide a bearing surface 1ᶜ for the contacts and a receding surface 1ᵈ, while the contacts are provided with extensions 5ᶜ bent inwardly to engage said receding surface, thereby firmly clamping said contacts to said base.

The contact arm 4 is fixed to an insulating arm 10 in turn fixed to a plate 11 pivotally mounted upon a stud 12. The arm 4 is thus insulated from its support but is adapted to be electrically connected thereto through a leaf spring 13. Spring 13 is fixed to a right angle extension 11ª of plate 11 and extends into proximity with a perpendicular lug 4ª of arm 4 but tends to spring away from said lug. However, the spring 13 is normally forced into engagement with lug 4ª by the return spring 6 of arm 4. Spring 6, which is of materially greater strength than spring 13, is coiled about post 12 and has one extremity thereof connected to a fixed collar 14 while its opposite extremity 6ª bears directly against spring 13, with the result mentioned. Thus so long as the spring 6 is active it will insure contact between spring 13 and lug 4ª thereby establishing circuit from the post 12 to contact arm 4. On the other hand, should the spring 6 break, or become otherwies disabled, the spring 13 would be relieved of the pressure thereof and would disengage lug 4ª thereby interrupting circuit between post 12 and arm 4 and as will appear, said arm is dependent upon the connection to post 12 for establishment of circuit. Accordingly should the spring 6 become disabled while the arm 4 is in retracted position, said arm would be rendered ineffective for establishment of circuit upon engagement with contacts 5 and should said spring become disabled while said arm is in contact engaging position circuit would be immediately interrupted by spring 13.

The post carrying the contact arm is secured to the base adjacent to one end by a nut 15, Fig. 5, which nut also clamps to the base a terminal plate 16. Thereby provision is made for connecting in circuit the controller arm while a terminal plate 17 provided at the opposite end of the base affords a connection for one terminal of the resistance. Terminal plate 17 is secured by a screw 18 which as best illustrated in Fig. 1, passes through the base from the contact side of the latter and overlaps the lowermost contact for electrical connection therewith.

The casing 2 is formed of two plates 2ª and 2ᵇ, the former being bent into a U-shape to form the bottom and ends and the latter bent into a similar shape to form the top and sides. These plates fit together to make a complete inclosure for the controller parts, the plate 2ª having an opening 19 therein to receive the circuit wires of the controller. The plate 2ª serves to alone support the controller parts, the same being provided at its right hand end with two supporting lugs 20 and 21 and at its left hand end with a single supporting lug 22 to which the base 1 is secured by suitable means, such as screws 23. Thus plate 2ᵇ is readily removable without disturbing any of the controller parts and the same may be readily secured to the plate 2ª by screws 24 threading into flanges 25 provided on the latter plate.

As will be understood without requiring a diagram, the controller is adapted to be used to control the continuity of the power circuit of an electric motor and to regulate the speed of the motor by varying the amount of resistance included in its armature circuit. Also, it will be understood that the controller establishes and interrupts the power connections by engaging and disengaging the uppermost contact 5 and initially includes the entire resistance 3. The rod 7 extends through the casing to provide means for moving the controller arm downwardly to establish the motor circuit and exclude in steps the resistance 3 while the spring 6 serves to move the arm in an opposite direction to progressively reinsert the steps of resistance and finally interrupt the motor circuit.

Referring now to Figs. 7 and 8, the controller is shown as mounted upon an arm 26 of a frame 27 adapted to rest upon the floor and provided with a treadle 28 for connection to and actuation of the rod 7.

Figs. 9 and 10, on the other hand, show the controller mounted upon an arm 29 of an alternative frame 30 provided with a lever 31 connected to the rod 7, this lever being designed for actuation either by foot or by the knee of the operator. The frame 30 is designed to either rest upon the floor for foot actuation of the lever 31 or to be secured to the side frame of the sewing machine for knee actuation.

It will, of course, be understood that the controller may be mounted in other ways and as above stated, the controller may act in other relations.

What I claim as new and desire to secure by Letters Patent is:

1. In a motor controller, in combination, a variable resistance, a plurality of contacts connected therewith, a controlling member to coöperate with said contacts, means biasing said member with respect to said contacts and a circuit making device associated with said member and effective upon failure of said biasing means to interrupt the circuit of said member.

2. In combination, a resistance, contacts connected therewith, a controlling member movable over said contacts to vary said resistance, means biasing said member against movement in one direction, and means governed by said biasing means to establish an electrical connection for said member and to break said connection upon failure of said biasing means.

3. In a motor controller, in combination, a variable resistance, a plurality of contacts connected therewith, a movable controlling member to coöperate with said contacts, a device associated with said member to establish a circuit connection therefor but tending to interrupt said connection and common biasing means for said device and said member.

4. In combination, coöperating stationary and movable contacts, an electrically connected resilient member for engaging said movable contact but biased against engagement therewith, and a preponderant biasing means for maintaining said member in engagement with said movable contact and biasing the latter against engagement with said stationary contact, whereby said movable contact is dependent for electrical connection upon the action of said biasing means.

5. In a motor controller, in combination, an insulating base having a recessed and beveled end portion and a reduced intermediate portion longitudinally serrated by slots of graduated lengths, conductive strips lying in said slots and having their outer terminals bent about said end portion to mechanically clamp the same thereto while providing contacts, a resistance element coiled about said base and connected at different points with the respective inner terminals of said strips, a controlling member pivotally mounted upon said base and movable for selectively engaging said contacts and means biasing said member against movement in one direction, said controlling member having an electrical connection dependent on said biasing means.

6. In a motor controller, in combination, a base provided with longitudinal slots of different length, a resistance element coiled about said base, conductive strips located in said slots and clamped to said base, said strips being electrically connected with different portions of said resistance element and having parts constituting contacts, a contact member movable for selectively engaging said contacts and means biasing said contact member against movement in a given direction, said contact member having an electrical connection dependent on said biasing means.

7. In a motor controller, in combination, a slotted insulating base, a resistance element coiled thereabout, conductive strips clamped to said base and lying in the slots thereof, said strips having parts constituting contacts and being electrically connected respectively with different portions of said resistance element, a contact member movable for coöperation with said contacts, means biasing said contact member against movement in one direction and a device rendered operative through said biasing means to establish a circuit connection for said member.

8. In combination, a fixed contact, a pivoted insulating arm, a contact carried thereby, an electrically connected resilient member carried by said arm for engaging said movable contact but biased against engagement therewith, and a coil spring surrounding the pivot of said arm and preponderating the resiliency of said member to hold the same in engagement with said contact while biasing said arm against engagement of said fixed and movable contacts, whereby the engagement of said member with said movable contact is broken upon failure of said coil spring.

9. In combination, a fixed contact, a movable arm carrying a contact for engaging said fixed contact, means biasing said arm against such engagement and circuit making means carried by said arm for engaging said movable contact and operating to disengage the same upon failure of said biasing means.

10. In combination, coöperating fixed and movable contacts, a fixed stud, an insulating arm pivotally mounted thereon for supporting said movable contact, an electrically connected resilient member carried by said arm for engaging said movable contact but biased therefrom, and a preponderant spring coiled about said stud for holding said member in engagement with said movable contact while biasing the latter against engagement with said fixed contact, whereby failure of said coiled spring releases said member for disengaging said movable contact.

In witness whereof I have hereunto subscribed my name.

ALBERT J. HORTON.